Inventors
PETER FORTESCUE
CORWIN L RICKARD
By Soans, Anderson, Luedeka & Fitch
Attys Aug. 17, 1965  P. FORTESCUE ETAL  3,201,321
NUCLEAR REACTOR Filed Dec. 7, 1960  3 Sheets-Sheet 3

Inventors
PETER FORTESCUE
CORWIN L. RICKARD
By Soans, Anderson, Suedeka & Ditch
Attys

United States Patent Office 3,201,321
Patented Aug. 17, 1965

3,201,321
NUCLEAR REACTOR
Peter Fortescue, Rancho Santa Fe, and Corwin L. Rickard, Solana Beach, Calif., assignors to General Dynamics Corporation, New York, N.Y., a corporation of Delaware
Filed Dec. 7, 1960, Ser. No. 74,291
4 Claims. (Cl. 176—59)

The present invention relates generally to nuclear reactors and is more particularly concerned with novel and improved arrangement of structure in a gas-cooled reactor.

The use of enriched fuel has made more attractive the selection of the gas-cooled type of reactors for commercial usage, particularly in that there is less need for conserving all possible neutrons for maintaining the chain reaction. Further, by using high temperature differentials the benefits of gas-cooling are utilized without serious handicap in the power density achieved.

It is a principal object of the present invention to provide a novel and improved arrangement of structure in a high temperature gas-cooled nuclear reactor. Another object is to provide an improved reactor core assembly, which affords stability and structural strength while permitting growth or expansion, and wherein the gas is circulated downwardly through the core. Still another object of the invention is to provide a nuclear reactor of particular advantage with fuel elements having the fuel compact and the moderator incorporated in an integral unit, to eliminate metal cladding of the fuel elements, and wherein the coolant is circulated through the core in a manner obviating the need for a pressure tight reflector around the sides of the core. Other objects and advantages will be apparent from the following description of a selected embodiment of the invention shown in the accompanying drawings, wherein:

Figure 1:
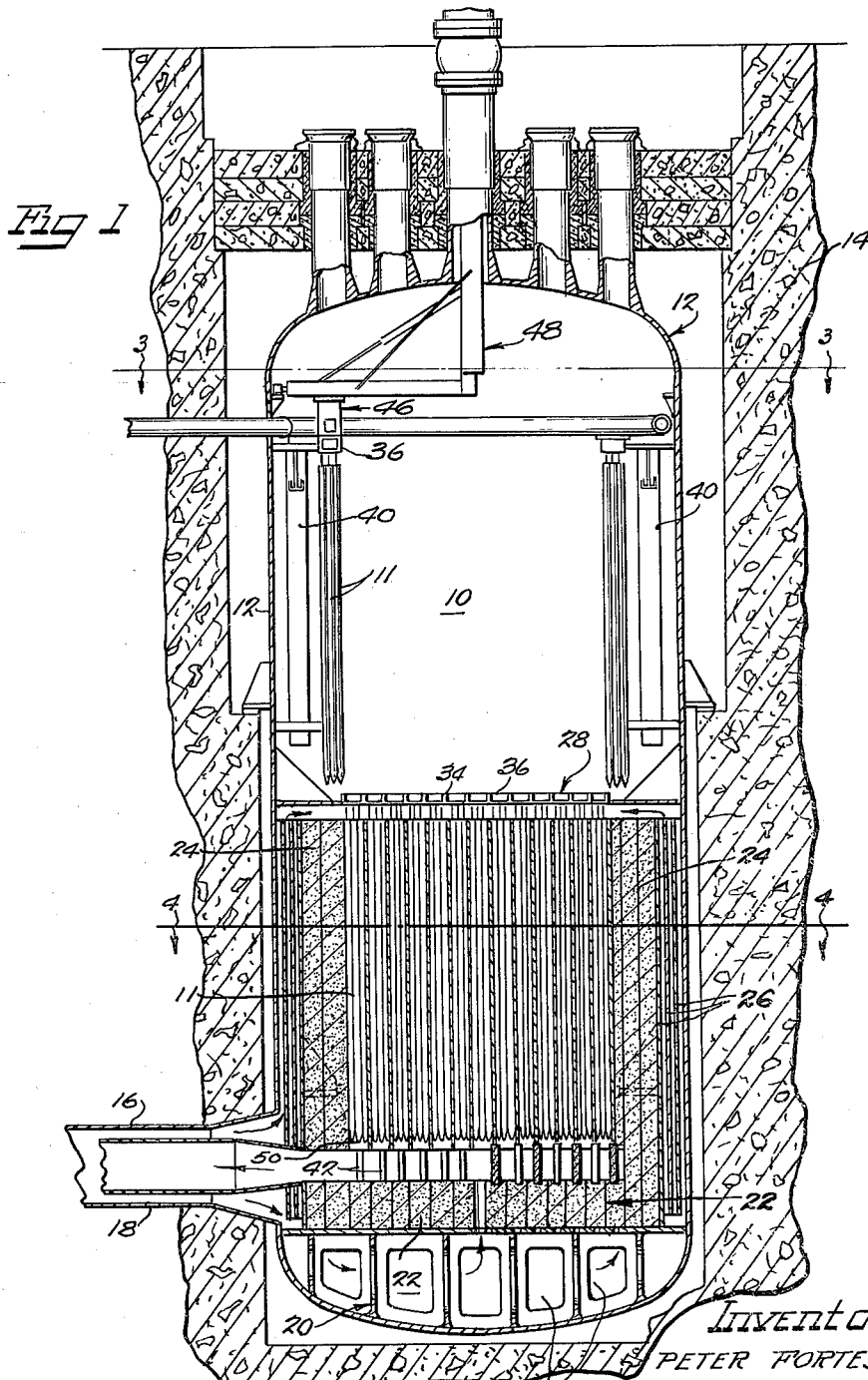
FIGURE 1 is a longitudinal sectional view of the nuclear reactor pressure vessel.

The reactor 10 shown in the drawings embodies generally the principle of combining the features of gas-cooling with a reactor core including fuel elements 11 having the fuel and moderator mixed to eliminate any metal case or cladding for the fuel element. The reactor core assembly, including the fuel element support means, reflectors, and the thermal shields, is arranged and constructed in a manner affording circulation of the coolant upwardly along the sides of the reactor vessel 12 and then downwardly through the fuel element-containing portion of the core. As the gas leaves the core it is directed to an outlet which is in communication with a steam generator, or the like, for converting the heated gas into usable energy.

In this reactor there is no particular attempt to achieve containment of all the fission products within the fuel elements, but rather it is the purpose of the illustrated design to minimize contamination by using relatively impervious graphite cladding for the fuel compact in association with a directed flow of the gas-coolant and a fission product trapping system, so as to confine activity to the core and/or a fission product trapping system so as to avoid contamination of the primary circuit for the gas coolant.

It has been found that in increasing the size of nuclear reactors in order to achieve a greater power capacity, it is undesirable to simply increase the size of the fuel elements because of the considerable reduction in power density which results. Instead a larger number of fuel elements are required of approximately the same size as those used in a smaller reactor, for example, a 150 megawatt reactor should employ fuel elements of approximately the size used in a 40 megawatt reactor. The increase in the number of fuel elements is accompanied by certain problems, but it also has the advantage that it improves neutron economy in the core and with this improved neutron economy it is possible to carry on a semi-continuous refueling of the reactor core, for example, one-fifth of the core may be recharged annually, and this provides more efficient operation of the reactor. Then too, a reduced storage area is needed for handling spent fuel elements, and it has been found that this storage area can be provided within the pressure vessel of the reactor and thereby eliminate many of the problems otherwise encountered in connection with storage areas employed outside of nuclear reactor pressure vessels. The present invention recognizes the advantages of such an arrangement and provides for storage in the upper half of the vessel, while confining the circulation of the gas-coolant through the reactor core to the lower half of the vessel and thereby maintaining the upper half in a relatively cool state.

Figure 4:
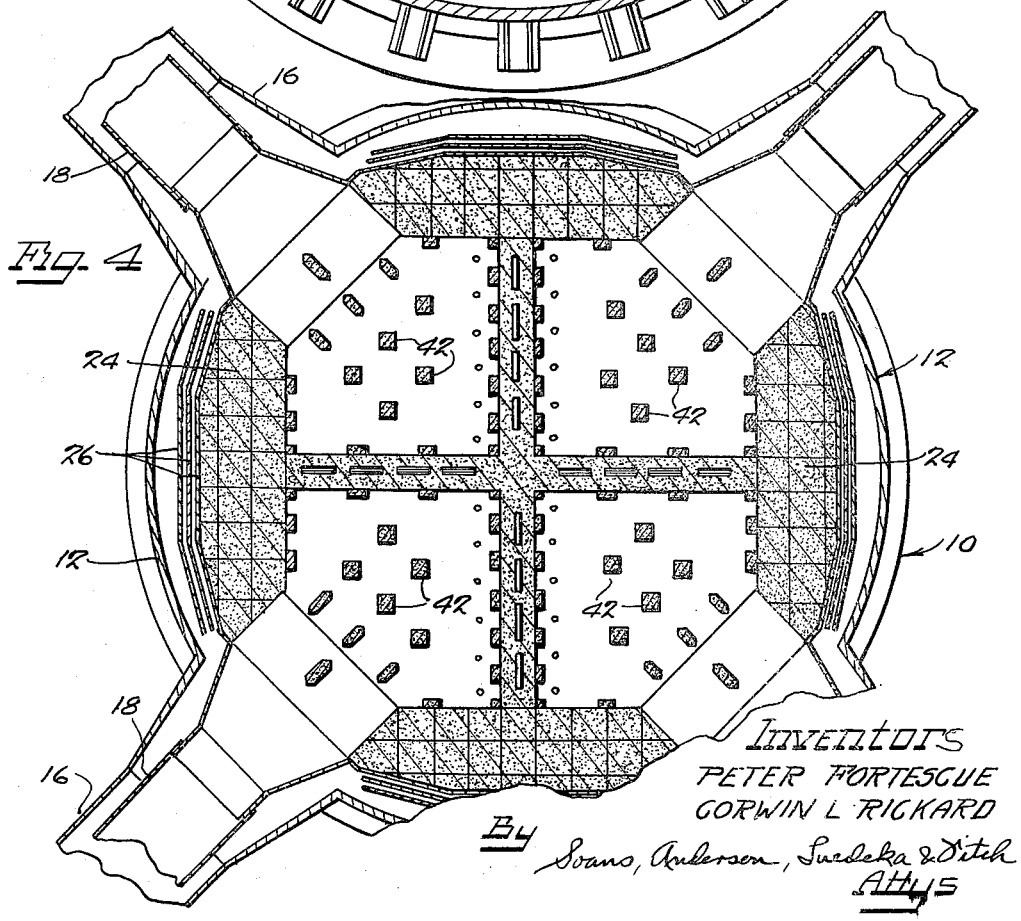
FIGURE 4 is a sectional view taken along the line 4—4 in FIGURE 1.

Looking particularly at FIGURE 1, it is seen that the embodiment of this invention comprises the pressure vessel 12 disposed within a suitable confining structure 14 of concrete, or the like, and having communication with a source of gas-coolant (not shown) and with a steam generator, or the like, for utilizing the heated gas by converting it into power. Such communication is provided by a pair of concentric ducts 16 and 18 disposed adjacent the bottom of the vessel, with the outer duct 16 carrying the coolant to the vessel 12 and the inner duct 18 returning the heated gas to the steam generator. In this respect, it is preferable that the reactor be used in conjunction with a plurality of power converting means, possibly four arranged circumferentially of the reactor vessel, as indicated in FIGURE 4.

The bottom of the vessel 12 includes a supporting base structure 20 of steel, or the like, upon which rests the entire core assembly, including a bottom reflector 22 of graphite or the like, side wall shields 24 of graphite or the like, and a plurality of thermal shields 26 disposed between the outer wall of the pressure vessel 12 and the side wall shields. At the upper end of the core and adjacent the center of the vessel is the top grid plate 28, preferably of metal or the like, which provides a support for the depending fuel elements and control rods and, in part, serves as a shield or reflector for the upper end of the core.

Figure 2:
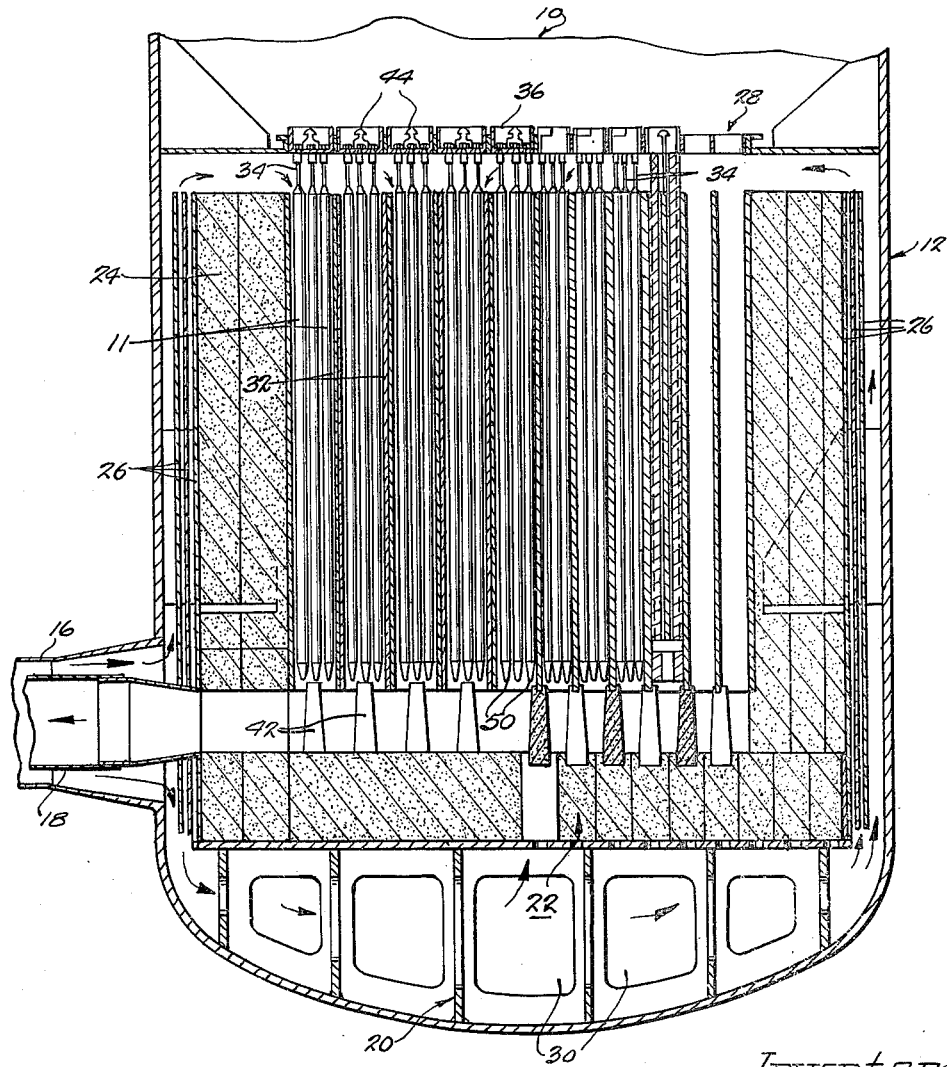
FIGURE 2 is an enlarged view of the lower half of the reactor vessel.

The structural steel base support 20 is provided with passageways 30 therethrough communicating with the inlet duct 16 for the coolant and affording cooling of the bottom grid plate as the gas-coolant is dispersed through the lower part of the core, before it passes upwardly between the three metal plates 26 forming the thermal shield for the core and along the side walls of the pressure vessel 12. As the gas-coolant reaches the upper end of the core, it is directed by the top grid plate 28 inwardly of the core, as indicated by the arrows in FIGURES 1 and 2, and then passes downwardly through the core where it absorbs the heat produced by the nuclear reaction carried on within the core. As the gas passes downwardly through the lower end of the fuel element portion of the core, it is then deflected by the bottom reflector 22 to pass outwardly through the inner duct 18 to the steam generator, or the like.

Figure 3:
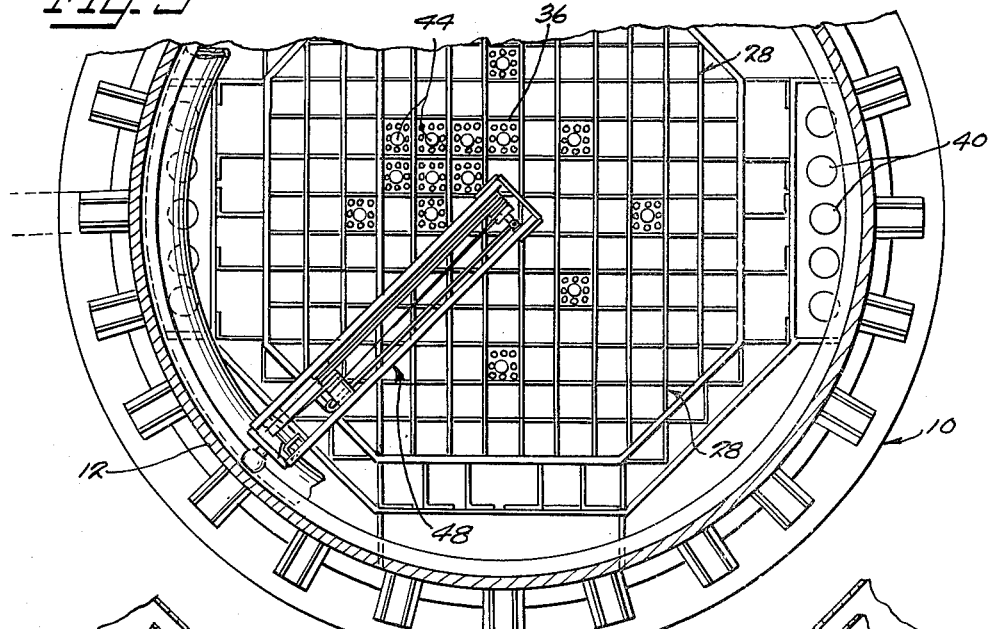
FIGURE 3 is a sectional view taken generally along the line 3—3 in FIGURE 1.

As indicated previously, the described reactor is intended for use with fuel elements having the moderator and the fuel compact mixed and having no metal case or the like for the element. In the preferred embodiment, the fuel elements each comprise an outer sleeve or casing of relatively gas impervious graphite in which is encased the fuel compact. A more detailed description of these elements and their associated supporting structure is found in our co-pending application Serial No. 74,290 and it is believed that a brief description of the fuel element arrangement will suffice for a proper understanding of the present invention. Generally, the elements are arranged in clusters of nine (FIGURE 3), and each cluster is disposed in a box-like case provided by separator plates 32 (FIGURE 2) disposed within the core. The upper ends of each of the cluster of nine elements are detachably secured by suitable hangers 34 to a box 36 which is supported on the top grid plate 28. The hanger member 34 thus supporting each element is provided with a passageway having communication with an axial bore in the fuel element and, at its upper end, with passages extending through the box 36 and then through passages in the top grid plate 28 to a fission product trap in the form of tanks 40 (FIGURE 1) suspended along the side wall of the reactor vessel at the upper portion thereof. Consequently, it will be noted that there is thereby provided a continuous fission product venting system which avoids build-up of internal pressure within the fuel element and the core.

The fuel element clusters are each arranged within a box-like compartment provided by a plurality of the separator plates 32 disposed within the core and supported at their lower ends on columns 42 resting on the lower grid plate 22. This arrangement maintains the elements 11 in position and yet permits growth or expansion. The supporting box structure 36 for each cluster of fuel elements is provided with an upwardly projecting grapple element 44 affording engagement thereof by the grappler head 46 of the fuel handling mechanism 48 for removal of each cluster as a unit.

The separators 32 providing the compartment or boxes for the fuel element clusters are effective to avoid by-pass of the coolant and to insure that it is properly directed through each cluster of elements. The separator plates may be made of integral members but are preferably built in sections and stacked vertically. Furthermore, they are arranged so that alternate clusters of elements are confined within a space formed by four of the surrounding boxes formed by the separator plates 32.

The bottom graphite reflector is formed in part by the fuel elements, which include a lower extension 50 (FIGURE 2) of graphite or the like, and in part by the fixed assembly of the lower grid 22 and the supporting columns 42 for the separator plates 32. Each box is supported at two diagonally opposite corners on a pair of these columns. The upper ends of the separator plates are suitably held in position, as by metal dowels or the like (not shown), which project down from the top grid plate into engagement with a recess in the separator plate.

It is thus seen that the described arrangement of the reactor core structure is such that the growth of the entire core is tied to that of the pressure vessel at the bottom and to the grid plate at the top. Expansion of the pressure vessel wall thus causes small and equal changes in the position of the boxes or separator plates while preserving the pattern of these plates as a whole. Furthermore, by circulating the gas-coolant, such as helium, downwardly through the core, the top of the vessel is kept relatively cool and is available for storage of spent fuel elements and for the fission trap tanks 40 seen along the vessel side walls in the drawings. The described circulation of the coolant is also advantageous in that it effectively cools the side reflector 24 and eliminates the need for a pressure tight reflector along the sides of the core. The pressure differential between the incoming gas and the gas moving downwardly through the center of the core is absorbed by the metal plates 26 forming the thermal shield around the core.

Although shown and described with respect to particular structure, it will be apparent that various modifications might be made without departing from the principles of this invention.

We claim:
1. A gas-cooled nuclear reactor including a pressure vessel, means extending across said vessel intermediate its upper and lower ends providing a barrier to gas flow between upper and lower sections of the vessel, a plurality of elongated fuel elements depending from and spaced below said barrier-providing means, said fuel elements providing a reactor core and defining a plurality of vertical passageways therebetween, which passageways extend from the space below said barrier-providing means, through said reactor core, to a position below said fuel elements, means defining a conduit located between said reactor core and the side walls of said pressure vessel, which conduit extends from a lower position below said reactor core to the space between said fuel elements and said barrier-providing means, inlet means in said vessel in communication with the lower end of said conduit, and outlet means in said vessel in communication with the lower ends of said passageways whereby a continuous path is provided for the circulation of gas-coolant upwardly in said conduit to said barrier-providing means, downwardly through said passageways and then out of said vessel, and whereby said upper section of said vessel is maintained in a relatively cool condition to accommodate fuel handling and storage apparatus.

2. A gas-cooled nuclear reactor including a vertically disposed pressure vessel, a top grid plate extending across said vessel intermediate its upper and lower ends providing a barrier to gas flow between upper and lower sections of the vessel, a bottom reflector disposed near the bottom of said lower section, a plurality of elongated vertically-disposed fuel elements depending from and spaced below said top grid plate, said fuel elements providing a reactor core and defining a plurality of vertical passageways therebetween which passageways extend from the space below said top grid plate, through said reactor core, to the upper surface of said bottom reflector, a side reflector surrounding said reactor core, means defining a conduit located between said side reflector and the side walls of said pressure vessel, which conduit extends from a lower position below said bottom reflector to the space between said fuel elements and said top grid plate, inlet means in said vessel in communication with the lower end of said conduit, and outlet means in said vessel in communication with the lower end of said passageways whereby a continuous path is provided for the circulation of gas-coolant under said bottom reflector and upwardly in said conduit to said top grid plate, downwardly through said passageways to the upper surface of said bottom reflector and then out of said vessel, and whereby said upper section of said vessel is maintained in a relatively cool condition to accommodate fuel handling and storage apparatus.

3. A gas-cooled nuclear reactor including a vertically-disposed pressure vessel, a top grid plate extending across said vessel intermediate its upper and lower ends providing a barrier to gas flow between upper and lower sections of the vessel, a bottom reflector disposed near the bottom of said lower section, a plurality of elongated vertically-disposed fuel elements depending from and spaced below said top grid plate, said fuel elements providing a reactor core and defining a plurality of vertical passageways therebetween which passageways extend from the space below said top grid plate, through said reactor core, to the upper surface of said bottom reflector, means defining a conduit located between said reactor core and the side walls of said pressure vessel, which conduit extends from a lower position below said bottom reflector to the space between said fuel elements and said top grid plate, a plurality of vertically extending tubular graphite separator boxes disposed to provide separate compartments for groups of fuel elements, column means extending upwardly from said bottom reflector and supporting said graphite separator boxes, inlet means in said vessel in communication with the lower end of said conduit, and outlet means in said vessel in communication with the lower end of said passageways whereby a continuous path is provided for the circulation of gas-coolant under said bottom reflector and upwardly in said conduit to said top grid plate, downwardly through said passageways to the upper surface of said bottom reflector and then out of said vessel, and whereby said upper section of said vessel is maintained in a relatively cool condition to accommodate fuel handling and storage apparatus.

4. A gas-cooled nuclear reactor comprising a vertically disposed, generally cylindrical pressure vessel, a reactor core disposed in a lower portion of said vessel, a top grid plate separating the lower portion from the upper portion of said vessel, said top grid plate extending completely across said vessel and providing a barrier to the upward flow of gas coolant, a hollow generally cylindrical reflector disposed spaced inwardly from the side wall of said pressure vessel in the lower portion thereof, a plurality of fuel elements located in the area within said hollow reflector, a plurality of vertically extending graphite boxes also disclosed within said hollow reflector, said boxes providing compartments for groups of said fuel elements, a bottom reflector disposed below said fuel elements in spaced relation thereto and in spaced relation above the bottom of said pressure vessel, a plurality of columns extending upwardly from said bottom reflector and supporting said graphite boxes in spaced relation above said bottom reflector, a plurality of concentric metal plates disposed around said side reflector in spaced relation thereto and in spaced relation to said vessel sidewall providing a thermal shield for the core, said top grid plate having an opening therein directly above each of said compartments, means closing each of said top grid plate openings and providing a unitary support for an underlying group of said fuel elements in depending, spaced relation to said top grid plate, inlet means in the lower section of said pressure vessel in communication with the spaces between said bottom reflector and the bottom of said pressure vessel and between said side reflector and the sidewall of said pressure vessel, and outlet means in said vessel at a position adjacent the lower end of said compartments and in communication with the lower ends of said compartments whereby a path is provided for circulation of the gas-coolant under said bottom reflector and upwardly along the sidewall of said vessel in the spaces between said sidewall, said metal plates, and said hollow reflector, centrally of the core by said top grid plate, downwardly through said compartments and then out said outlet means, and whereby the upper portion of said vessel is maintained in a relatively cool condition to accommodate fuel handling and storage apparatus.

References Cited by the Examiner

UNITED STATES PATENTS

| | | | |
|---|---|---|---|
| 2,898,280 | 8/59 | Schultz | 176—78 |
| 2,917,444 | 12/59 | Dreffin | 176—51 |
| 2,920,025 | 1/60 | Anderson | 176—65 |
| 2,982,712 | 5/61 | Heckman | 176—20 |
| 2,997,435 | 8/61 | Millar | 176—59 |
| 3,000,728 | 9/61 | Long | 176—61 |
| 3,010,889 | 11/61 | Fortescue | 176—19 |
| 3,034,689 | 5/62 | Stoughton et al. | 176—59 X |
| 3,089,834 | 5/63 | Madsen | 176—30 |

CARL D. QUARFORTH, *Primary Examiner.*

REUBEN EPSTEIN, *Examiner.*